United States Patent Office 3,549,765
Patented Dec. 22, 1970

---

3,549,765
1 - (SUBSTITUTED) - 5 - AMINOTETRAZOLES AND TREATMENT OF INFLAMMATION OF THE ANIMAL ORGANISM THEREWITH
Takashi Enkoji, Park Forest, and Charles D. Bossinger, Olympia Fields, Ill., assignors to Armour Pharmaceutical Company, Chicago, Ill., a corporation of Delaware
No Drawing. Filed Oct. 10, 1966, Ser. No. 585,251
Int. Cl. A61k 27/00
U.S. Cl. 424—269
12 Claims

ABSTRACT OF THE DISCLOSURE

Methods and compositions for the therapeutic treatment of inflammation in an animal organism using 1-substituted-5-aminotetrazoles therewith and therein; and certain novel pharmacologically active 1-substituted-5-amino-tetrazoles.

---

This invention relates to therapeutic treatment of the animal organism with 1-substituted-5-aminotetrazoles. More particularly, the invention relates to treatment methods and compositions, and to novel pharmacologically active 1-substituted-5-aminotetrazoles employed in the methods and compositions.

Inflammatory conditions, exhibiting one or more of the symptoms of redness, pain, heat and swelling, have in the past been treated with various analgesics, antipyretics, narcotics, hormones, and steroids, alone or in combination. Referring to the rheumatoid diseases, particularly rheumatoid arthritis, as illustrative, it is generally accepted that the most desirable result is achieved by the administration of the glucocorticoid steroids, when the subject can assimilate and tolerate the drug. However, extreme care must be exercised in administering the steroids, to avoid or minimize the various undesirable side effects which are encountered. The steroids must be employed with extreme caution, if at all, in the presence of various other diseases and conditions of the subject. Also, the subject frequently is resistant to steroid therapy. Accordingly, the need continues for anti-inflammatory agents, compositions, and treatment methods which do not involve the use of steroids.

Another area of treatment that is of substantial interest involves the central nervous system. It is especially desirable that new compounds, compositions, and treatment methods be provided for producing muscle-relaxation, more particularly, long-lasting relaxation of the skeletal muscles.

We have now discovered in accordance with the invention that 1-substituted-5-aminotetrazoles, and particularly that certain 1-substituted phenyl-5-aminotetrazoles such as 1-halophenyl-5-aminotetrazoles, 1-alkylphenyl-5-aminotetrazoles, 1-alkoxyphenyl-5-aminotetrazoles and 1-hydroxyphenyl-5-aminotetrazoles; and certain 1-substituted benzyl-5-aminotetrazoles, such as 1-halobenzyl-5-aminotetrazoles and 1-alkylbenzyl-5-aminotetrazoles, and 1-phenethyl-5-aminotetrazole possess advantageous pharmacological properties. In particular, these compounds possess anti-inflammatory and central nervous system depressant, especially muscle relaxant activities.

This invention also provides new pharmaceutical compositions employing said 1-substituted-5-aminotetrazoles or a pharmaceutically acceptable salt thereof as an active agent and new methods of treating the animal organism thereyith, especially to alleviate inflammatory conditions and to produce muscle relaxation.

This invention also provides novel 1-substituted-5-aminotetrazoles wherein the substituting moiety is monobromophenyl, monofluorophenyl, dichlorophenyl, monochlorobenzyl and monomethylbenzyl.

The 1-monochlorophenyl-5-aminotetrazoles were known prior to the present invention (Henry et al., J. Am. Chem. Soc., 76, 88–93, 1954). However, so far as we are aware, these compounds were not known to possess the anti-inflammatory and central nervous system depressant activities and utility in the treatment of the animal organism discovered by us. The 1-monobromophenyl-, 1-monofluorophenyl-, and 1-dichorophenyl-5-aminotetrazoles as well as the 1-monochlorobenzyl-5-aminotetrazoles and 1-methylbenzyl-5-aminotetrazole provided by the invention are new compounds, so far as we are aware, having anti-inflammatory and central nervous system depressant activities.

To aid in the understanding of the invention, we shall now describe the preparation of a 1-substituted-5-aminotetrazole for illustrative purposes shall refer to 1-halophenyl-5-aminotetrazole to typify the compounds.

The 1-halophenyl-5-aminotetrazoles can be prepared by reacting halophenylthiourea with an alkyl halide to produce halophenyl-S-alkyl-isothiourea hydrohalide, the reaction being represented as follows:

wherein R is halogen-substituted phenyl, $R_1$ is methyl or ethyl, and X is chloro or bromo. The product is reacted with hydrazine to produce 1-halophenyl-3-aminoguanidine hydrohalide:

The product is reacted with nitrous acid to produce the 1-halophenyl-5-aminotetrazole:

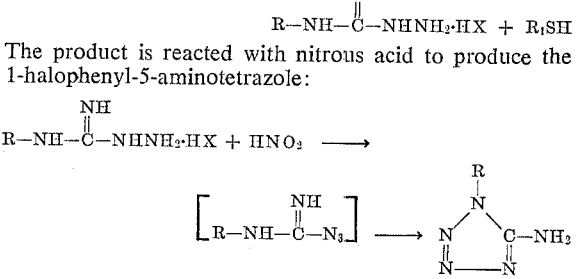

In the preferred embodiments of the invention, R is monochlorophenyl, monobromophenyl, monofluorophenyl, dichlorophenyl, monomethylphenyl, monomethoxyphenyl, dimethylphenyl, monochlorobenzyl or monomethylbenzyl.

The 1-substituted-5-aminotetrazoles may be employed as the free bases or in the form of their non-toxic pharmaceutically acceptable salts. Thus, for example, organic and inorganic acid addition salts may be employed, such as the salts of sulfuric, nitric, phosphoric, citric, acetic, lactic, tartaric, sulfamic, succinic, fumaric, maleic, ethanedisulfonic, hydrobromic, benzoic and similar nontoxic acids. The salts may be prepared by reacting the tetrazole bases with excess acid in a suitable solvent, such as ethanol, acetone, water, or mixtures thereof. The mixture is heated to effect solution, and the salts crystallize on cooling.

The 1-substituted-5-aminotetrazoles and their salts are administered in therapeutically effective amounts to animals, including man, and in appropriate ways. Thus, daily dosages of about 50 milligrams to 8000 milligrams, preferably about 300 milligrams to 4000 milligrams may be provided in systemic administration to man, e.g., orally or parenterally. The compounds may be administered systemically to animals other than man in daily dosages up to about 400 milligrams per kilogram of body weight. Lesser quantities of the compounds may be administered at the situs of the condition under treatment, as low as 1 milligram, administering the compounds topically, interarticularly, and the like. The foregoing and other dosage levels herein are based on the content of tetrazole base.

The compounds have long-lasting effects, lasting as long as 24 hours or more, a low order of toxicity, and relatively few observed side effects.

In the preferred embodiments of the invention, a 1-substituted-5-aminotetrazole or a salt thereof is administered in a pharmaceutical composition which includes the tetrazole compound and a pharmaceutical carrier. The carrier is a nontoxic pharmaceutical grade substance, which may be either solid or liquid. Suitable solid carriers include lactose, magnesium stearate, starch, sucrose, mannitol, sorbitol, cellulose powder, dicalcium phosphate, talc, stearic acid, gelatin, agar pectin, acacia and the like. Suitable liquid carriers include glycols, polyglycols, peanut oil, olive oil, sesame oil, alcohols, water, and the like. If desired, the carrier may include a time delay material such as glycerol monostearate, or glycerol di-stearate, alone or with a wax.

The composition preferably is provided in unit dosage form for accuracy and convenience in administration. Where appropriate, oral administration is effective and preferred, and dosage units suitable for oral administration are provided. Examples of such dosage units employing solid carriers include tablets, filled capsules, packets and the like, and lozenges. The amount of solid carrier per dosage unit may vary widely, preferably from about 25 milligrams to 1 gram.

The tetrazoles and their salts may be compounded with semi-solid and liquid carriers in solutions, suspensions, emulsions, ointments, suppositories and soft gelatin capsules, for example. Such compositions may be administered pancavally, i.e., via natural and artificial openings in the body, such as the mouth, the anus, the vagina, the nares, and the stoma of colostomy patients, intravenously, intramuscularly, or topically, employing the appropriate composition having a suitable concentration of active ingredient according to the desired route of administration.

The foregoing dosage forms are prepared by conventional procedures of mixing, granulating, compressing, suspending, and/or dissolving, as suitable for the desired dosage form.

An inflammatory condition of the animal organism is treated in accordance with the invention by administering a 1-substituted-5-aminotetrazole of the invention or a pharmaceutically acceptable salt thereof in an amount sufficient to alleviate the symptoms of the condition. The compound preferably is administered at a dosage level as described above, and preferably in a pharmaceutical carrier. The dosage level and frequency are to a certain extent subjective, taking into consideration the cause of the inflammation, the case history, the reaction of the subject, and the like. The daily dosage may be administered in one or more parts during the day. Administration may be made pancavally, intramuscularly, intravenously, or topically. Administration preferably is oral in the treatment of diseases such as the rheumatoid diseases, most conveniently by means of tablets containing one of the active compounds and a pharmaceutical carrier.

Of the 1-substituted-5-aminotetrazole compounds which may be employed for treating inflammatory conditions in accordance herewith, the 1-(monohalophenyl)-5-aminotetrazoles and the 1-dichlorophenyl-5-aminotetrazoles are preferred, including the meta-chlorophenyl, meta-bromophenyl, meta-fluorophenyl, 2,3-dichlorophenyl, 2,4-dichlorophenyl, 2,5-dichlorophenyl, 2,6-dichlorophenyl, 3,4-dichlorophenyl, and 3,5-dichlorophenyl derivatives and their pharmaceutically acceptable salts.

Good results were obtained in anti-inflammatory bioassays using 1-(p-methoxyphenyl)-5-aminotetrazole, 1-(m-methoxyphenyl)-5-aminotetrazole, 1-benzyl-5-aminotetrazole, 1-(o-methylphenyl)-5-aminotetrazole, 1-(m-methylphenyl)-5-aminotetrazole, 1-(p-methylphenyl)-5-aminotetrazole, 1-(o-monochlorobenzyl)-5-aminotetrazole, 1-(p-monochlorobenzyl)-5-aminotetrazole, 1-(p-methylbenzyl)-5-aminotetrazole, 1-(3,4-dichlorobenzyl)-5-aminotetrazole, 1-(2,4-dichlorobenzyl)-5-aminotetrazole, 1-phenethyl-5-aminotetrazole, 1-(o-hydroxyphenyl)-5-aminotetrazole, and 1-(2,6-dimethylbenzyl)-5-aminotetrazole.

The 1-(substituted)-5-aminotetrazoles may be administered to subjects having abnormal muscle tone and tension, to produce muscle relaxation in ways similar to the administration used for anti-inflammatory benefits. A sufficient amount of the compound is administered to produce the desired relaxation, preferably in the dosage ranges set forth above. The active compound preferably is administered together with a pharmaceutical carrier. The compound is administered internally, preferably orally or parenterally, it being further preferred to employ oral administration in tablets. Administration may take place in equal doses one or more times daily, to provide the desired daily dosage.

We have obtained especially good results when administering to the animal organism the following 1-substituted-5-aminotetrazoles to obtain muscle relaxation therein. The tetrazoles so used are:

1-(m-methylphenyl)-5-aminotetrazole,
1-(p-methylphenyl)-5-aminotetrazole,
1-(2,6-dimethylphenyl)-5-aminotetrazole,
1-(o-methylphenyl)-5-aminotetrazole,
1-(2,6-dichlorophenyl)-5-aminotetrazole,
1-(o-monochlorophenyl)-5-aminotetrazole,
1-(m-monochlorophenyl)-5-aminotetrazole,
1-(p-monochlorophenyl)-5-aminotetrazole,
1-(o-bromophenyl)-5-aminotetrazole,
1-(m-bromophenyl)-5-aminotetrazole,
1-(p-bromophenyl)-5-aminotetrazole,
1-(o-fluorophenyl)-5-aminotetrazole,
1-(m-fluorophenyl)-5-aminotetrazole,
1-(p-fluorophenyl)-5-aminotetrazole,
1-(o-methoxyphenyl)-5-aminotetrazole,
1-benzyl-5-aminotetrazole,
1-(o-monochlorobenzyl)-5-aminotetrazole,
1-(m-monochlorobenzyl)-5-aminotetrazole,
1-(p-monochlorobenzyl)-5-aminotetrazole,
1-phenethyl-5-aminotetrazole.

The onset of activity in the animal organism is rapid, results being observed within one half hour, and the activity is sustained. Thus, the activity levels remain high for two or more hours, and activity persists over a 24 hour period. The long-lasting activity is of particular significance, inasmuch as prior muscle relaxants lacked the desired duration of activity.

Of the 1-substituted-5-aminotetrazoles which may be employed to produce muscle relaxation, those having ortho substitution appear to provide most desirable results. Thus, the 1-(ortho-monohalophenyl)-5-aminotetrazoles, 1-(2,6-dichlorophenyl)-5-aminotetrazole, ortho-monomethyl-5-aminotetrazole and 1-(2,6-dimethylphenyl)-5-aminotetrazole are preferred.

The following examples are illustrative of the preparation of the 1-substituted-5-aminotetrazoles employed in the invention, especially the novel compounds of the invention, of the new pharmaceutical compositions, and of the treatment of the animal organism in accordance with the invention and the activities exhibited in such treatment. It is to be understood that the invention is not limited to the examples or to the compounds, compositions, proportions, conditions, and methods set forth therein, which are only illustrative. Throughout the examples, the 1-halophenyl-5-aminotetrazoles have been used to typify the compounds and compositions of the invention.

EXAMPLE 1

The preparation of a 1-dichlorophenyl-5-aminotetrazole is illustrated by the preparation of 1-(2,4-dichlorophenyl)-5-aminotetrazole, as follows:

To a solution of 11.8 g. (0.053 mole) of 2,4-dichlorophenyl thiourea in 50 ml. of anhydrous ethanol was added 7.5 g. (0.053 mole) of methyl iodide. The solution was stirred for 30 minutes at room temperature and then refluxed for an additional 30 minutes. The solvent was removed by distillation under reduced pressure. The solid residue was washed with 100 ml. of anhydrous ether and dried to yield 16.8 g. (86% of theory) of 1-(2,4 - dichlorophenyl)-S-methylisothiourea hydriodide, M.P. 169–70°. This material was used in the next step without further purification.

To a suspension of 16.8 g. (0.046 mole) of crude 1-(2,4-dichlorophenyl)-S-methylisothiourea hydriodide in 40 ml. of anhydrous ethanol was added 1.7 g. (0.05 mole) of anhydrous 95% hydrazine. The mixture was heated gently until the initial vigorous evolution of methyl mercaptan had subsided. The solution was refluxed for an additional hour and the solvent was removed by distillation under vacuum. The oil which remained solidified upon standing, and the solid cake was broken up, washed with anhydrous ether and dried to yield 12.9 g. (81% of theory) of 1-(2,4-dichlorophenyl)-3-aminoguanidine hydriodide, M.P. 134–7° C. This material was used in the next step without further purification.

To a solution of 12.9 g. (0.038 mole) of 1-(2,4-dichlorophenyl)-3-aminoguanidine hydriodide in 85 ml. of warm water was added a mixture of 0.6 ml. of concentrated nitric acid, 20 ml. of water and 6.70 g. (0.11 mole) of silver nitrate. After mixing for 5 minutes, 2 ml. of concentrated hydrochloric acid was added, and the precipitated silver halides were removed by filtration and washed with a few ml. of water. The filtrates and wash water were combined and diluted to 170 ml., and an additional 2 ml. of concentrated hydrochloric acid was added. The mixture was cooled with stirring to 10° C. in an ice bath, and a cold solution of 2.86 g. (0.041 mole) of sodium nitrite in 20 ml. of water was added dropwise at a rate to maintain the temperature at 10–15° C. When addition was completed, stirring and cooling were continued for 30 minutes and the pH of the reaction mixture was adjusted to 8–9 by the careful addition of solid sodium carbonate. The mixture was heated to 50° C. and recooled to 10° C. The precipitate was collected by filtration, washed with cold water and dried. The dried solid was recrystallized from 170 ml. of ethanol to yield 6.12 g. (72% of theory) of 1-(2,4-dichlorophenyl)-5-aminotetrazole, M.P. 243–4° C. dec. A sample for analysis was recrystallized several times from isopropanol, M.P. 244–6° C. dec.

The following dichlorophenyl derivatives are prepared in like manner, and they have the indicated melting points:

| Derivatives: | M.P., °C. with dec. |
|---|---|
| 2,3-dichlorophenyl | 247–8 |
| 2,5-dichlorophenyl hydrate (2½ H₂O) | 181–2 |
| 2,5-dichlorophenyl (anhydrous) | 262 |
| 2,6-dichlorophenyl | 244–5 |
| 3,4-dichlorophenyl | 204–5 |
| 3,5-dichlorophenyl | 254–5 |

EXAMPLE 2

The preparation of 1-monohalophenyl-5-aminotetrazoles is illustrated by the preparation of 1-(para-bromophenyl)-5-aminotetrazole, as follows:

By the method described in the Example 1, p-bromophenyl-S-methylisothiourea hydriodide was prepared from 50.2 g. (0.22 mole) of p-bromophenyl thiourea, 31.2 g. (0.22 mole) of methyl iodide and 400 ml. of anhydrous ethanol. The yield was 79.4 g. (97% of theory), M.P. 200–1° C. dec.

A mixture of 37.3 g. (0.1 mole) of p-bromophenyl-S-methylisothiourea hydriodide, 3.71 g. (0.11 mole) of 95% anhydrous hydrazine and 200 ml. of anhydrous ethanol was refluxed for 1½ hours and worked up as in Example 1 to yield 30.6 g. (85% of theory) of 1-(p-bromophenyl) 3-aminoguanidine hydriodide as a semi-solid.

All of this material was converted to the corresponding tetrazole compound as in Example 1. Concentrated ammonium hydroxide was used instead of sodium carbonate to adjust the pH of the final reaction mixture to 8. The yield of crude product was 14.6 g., M.P. 187–9° C. dec. This material was recrystallized twice from 6 N hydrochloric acid and dried at 100° C. under vacuum to yield 5.76 g. (28% of theory) of pure 1-(p-bromophenyl)-5-aminotetrazole, M.P. 242–3° C. dec.

The following new monohalophenyl derivatives are prepared in like manner, and they have the indicated melting points:

| Derivatives: | M.P. °C. with dec. |
|---|---|
| Ortho-bromophenyl | 224–5 |
| Meta-bromophenyl | 185–6 |
| Ortho-fluorophenyl | 174–5 |
| Meta-fluorophenyl | 170–1 |
| Para-fluorophenyl | 195–6 |

EXAMPLE 3

The following are examples of several types of pharmaceutical compositions according to the invention:

Composition A

Tablets suitable for oral administration and having the following composition per tablet are produced by compounding the ingredients in the same relative proportions:

| Ingredients: | Amount, mg. |
|---|---|
| 1-substituted-5-aminotetrazole | 200 |
| Sorbitol | 15 |
| Mannitol | 85 |
| Gelatin, as a 10% aqueous solution | 6 |
| Corn starch | 30 |
| Magnesium stearate | 4 |

The first three ingredients are milled together to a uniform powder and granulated into the gelatin solution. The mixture is screened onto trays and dried at 60° C. The dried granules are sized, mixed with the corn starch and the magnesium stearate, and compressed into tablets.

Composition B

Tablets suitable for oral administration and having the following composition per tablet are produced by compounding the ingredients in the same relative proportions:

| Ingredients: | Amount, mg. |
|---|---|
| 1-substituted-5-aminotetrazole | 200 |
| Microcrystalline cellulose [1] | 150 |
| Polyvinyl pyrrolidone | 5 |
| Magnesium stearate | 4 |

[1] Avicel (FMC Corporation, U.S. Pat. No. 2,978,446), average particle size 38 microns.

The first three ingredients are mixed to uniformity and lubricated with a portion of the magnesium stearate. The mixture is compressed into slugs, and the slugs are reduced to uniformity and granulated. The granules are lubricated with the remainder of the magnesium stearate and compressed into tablets.

Composition C

Filled gelatin capsules suitable for oral administration and containing the following composition in each capsule are produced by compounding the ingredients in the same relative proportions:

| Ingredients: | Amount, mg. |
|---|---|
| 1-substituted-5-aminotetrazole | 200 |
| Lactose | 175 |
| Magnesium stearate | 5 |

The above ingredients are screened through a #40 U.S. mesh screen to a uniform powder, transferred to a mixer, mixed well, and filled into #1 hard gelatin capsules.

Composition D

Filled soft gelatin capsules suitable for oral administration and containing the following composition in each capsule are produced by compounding the ingredients in the same relative proportions:

| Ingredients: | Amount, mg. |
|---|---|
| 1-substituted-5-aminotetrazole | 50 |
| Sesame oil | 50 |

The ingredients are mixed to form a thick slurry, and the slurry is filled into soft gelatin capsules.

Composition E

Filled soft gelatin capsules suitable for oral administration and containing the following composition in each capsule are produced by compounding the ingredients in the same relative proportions:

| Ingredients: | Amount, mg. |
|---|---|
| 1-substituted-5-aminotetrazole | 300 |
| Polyethylene Glycol 400 | 240 |

The ingredients are mixed to form a thick slurry, and the slurry is filled into soft gelatin capsules.

Composition F

The following ingredients are compounded to provide a solution suitable for intramuscular administration:

| Ingredients: | Amount, mg. |
|---|---|
| 1-substituted-5-aminotetrazole | g.. 200 |
| Polyethylene glycol 200 q.s. up to 1 liter. | |

The ingredients are mixed and warmed to about 50–60° C. with stirring to effect solution. The solution is sterile filtered, cooled to room temperature, and packaged in sterile vials.

Composition G

Suppositories melting at about 60° F. and each having the following composition are produced by compounding the ingredients in the same relative proportions:

| Ingredients: | Amount, mg. |
|---|---|
| 1-substituted-5-aminotetrazole | 200 |
| Polyethylene Glycol 600 | 200 |
| Polyethylene Glycol 4000 | 800 |

The ingredients are mixed and heated to about 60° C. to effect solution. The solution is poured into cooled molds and allowed to cool and thereby solidify.

Composition H

An ointment suitable for topical administration has the following composition, in parts by weight:

| Ingredients: | Parts |
|---|---|
| 1-substituted-5-aminotetrazole | 200 |
| Polyethylene Glycol 1540 | 500 |
| Polyethylene Glycol 4000 | 80 |
| Propylene glycol | 200 |
| Cetyl alcohol | 20 |

The polyethylene glycols and the cetyl alcohol are mixed and warmed to about 60° C. The tetrazole then is stirred into the mixture to effect solution. The propylene glycol is added to the solution with stirring until cool. The cool ointment is filled into jars.

Composition I

Tablets used for oral administration of 1-(2,4-dichlorophenyl)-5-aminotetrazole as described hereinafter and having the following composition per tablet are produced by compounding the ingredients in the same relative proportions:

| Ingredients: | Amount, mg. |
|---|---|
| 1-(2,4-dichlorophenyl)-5-aminotetrazole | 200 |
| Dicalcium phosphate | 180 |
| Corn starch | 60 |
| Polyvinylpyrrolidone | 5 |
| Magnesium stearate | 4 |

The tetrazole, dicalcium phosphate and a portion of the starch and magnesium stearate are mixed, granulated with an alcoholic solution of the polyvinylpyrrolidone, dried, and sized. The remainder of the starch and the magnesium stearate are added and mixed. This mixture then is compressed into tablets.

Composition J

Tablets used for oral administration of 1-(2,4-dichlorophenyl)-5-aminotetrazole as described hereinafter and having the following composition per tablet are produced by compounding the ingredients in the same relative proportions:

| Ingredients: | Amount, mg. |
|---|---|
| 1-(2,4-dichlorophenyl)-5-aminotetrazole | 200 |
| Lactose | 200 |
| Microcrystalline cellulose | 30 |
| Polyvinylpyrrolidone | 5 |
| Amberlite XE-88 [1] | 5 |
| Magnesium stearate | 4 |

[1] Potassium salt of a carboxylic acid cation exchange resin.

The first three ingredients are mixed, granulated with an alcoholic solution of the polyvinylpyrrolidone, dried, and sized. The Amberlite and the magnesium stearate are added. The batch is mixed and compressed into tablets.

EXAMPLE 4

1-substituted-5-aminotetrazoles were tested for anti-inflammatory activity in rats by a granuloma pouch assay used to evaluate steroids. In this assay, 25 ml. of air is injected subcutaneously to form an air pouch on the dorsal side of the rats. An injection is made into each pouch, of 0.5 ml. of corn oil containing 1% of croton oil as an irritant. The irritant action causes the formation of an inflammatory exudate which averages 7 to 9 ml. at the end of 4 days.

The 1-substituted-5-aminotetrazoles were administered to respective groups of six injected rats and compared with a control group of injected rats receiving no such compound. The tetrazoles were administered orally in 1% aqueous pectin, initially at the time of introduction of the irritant and thrice subsequently at 24 hour intervals. The aqueous composition was administered to the animals at a constant volume of 1 ml. per 100 grams of body weight, and the tetrazole concentration was adjusted to provide the desired dosage level.

The animals were sacrificed 24 hours after the last administration, i.e., 4 days from the start of the test. The volume of exudate formed in the pouch of each animal was measured. The percent inhibition of inflammation was determined as the quotient of: the average volume of exudate of the control minus the average exudate volume of the group of animals treated divided by the average volume of exudate of the control group of animals, multiplied by 100. The anti-inflammatory activities of a number of the tetrazoles determined in this manner are shown in Table I, below.

The 1-substituted-5-aminotetrazoles were also tested for anti-inflammatory activity by a cotton pellet assay. In this assay, cotton pellets were implanted in the lateral dorsal regions of adrenalectomized rats. The cotton pellets weighed 10 mg. ±0.1 mg., and they were matched for the tests. An untreated control pellet was placed on one side of each rat, and a treated pellet was placed on the opposite side. The treated pellet contained 0.5 mg. of the tetrazole suspended in an aqueous medium containing, in grams per liter, 10 gm. of carboxymethylcellulose No. 70, 1 gram of Tween 80, 1.8 grams of methyl-p-hydroxybenzoate, 0.2 gram of propyl p-hydroxybenzoate, and 0.15 gram of Methocel. At least 4 to 10 animals were included in each of the test and control groups.

After 4 days, the pellets were removed, dried in vacuo at atmospheric temperature, and weighed. Reduction or inhibition of the formation of granulation tissue in the test pellets was determined as the difference between the weight of the control pellet and the weight of the test pellet in each case, and the results were averaged for the respective groups. The results are set forth in Table I, below.

TABLE I.—ANTI-INFLAMMATORY ACTIVITIES OF 1-SUBSTITUTED-5-AMINOTETRAZOLES

| | Granuloma dose, mg./kg. | Pouch assay percent inhibition | Cotton pellet assay reduction in granulation |
|---|---|---|---|
| Phenyl substituent: | | | |
| m-Chloro | 200 | 53 | 2.3 |
| m-Bromo | 200 | 57 | 1.3 |
| m-Fluoro | 200 | 58 | 0.7 |
| o-Chloro | 200 | 36 | 0.8 |
| o-Bromo | 200 | 14, 4 | 0.6, 0.6 |
| o-Fluoro | 200 | 32 | 0.9 |
| p-Chloro | 200 | 60, 37 | 0.6 |
| p-Bromo | 100 | −20 | 1.3 |
| p-Fluoro | 200 | 54 | −0.2 |
| 2,3-dichloro | 200 | 7 | 1.3 |
| 2,4-dichloro | 100 | 11 | 1.0 |
| 2,5-dichloro | 200 | 49 | |
| 2,6-dichloro | 200 | 36 | |
| 3,4-dichloro | 200 | 63 | 1.2 |
| 3,5-dichloro | 100 | 46 | 1.6 |
| o-Methyl | 200 | 94 | |
| m-Methyl | 100 | 34 | |
| p-Methyl | 200 | 27 | |
| 2,6-dimethyl | 200 | 25 | |

The results summarized in Table I indicate that each of the compounds possesses anti-inflammatory activity. The activity desired is at least about 30% inhibition in the granuloma pouch assay or at least about 1 mg. reduction in granulation in the cotton pellet assay.

EXAMPLE 5

Central nervous system depressant activities were determined for 1-substituted-5-aminotetrazoles, by a mouse battery assay. Mice were tested in groups of five, employing three treated groups and one untreated control group for each test. The average response to each tetrazole was determined at 200 mg./kg. The tetrazoles were administered orally in 1% aqueous pectin, administering 2 ml. per 100 grams of body weight to each animal. Separate assays were run 30, 60 and 120 minutes after drug administration, and the results are reported in Table II which follows, as the average response for all three time periods. The table shows the average fall of body temperature, hind limb extensor tonus block, and increase in Metrazol threshold.

TABLE II.—CENTRAL NERVOUS SYSTEM DEPRESSANT ACTIVITIES OF 1-SUBSTITUTED PHENYL-5-AMINOTETRAZOLES

| | Body temp. fall, °F. | H.L. extensor tonus block, percent of animals | Metrazol threshold increase, percent |
|---|---|---|---|
| Phenyl substituent: | | | |
| m-Chloro | 2.2 | 100 | 107 |
| m-Bromo | 2.2 | 100 | 62 |
| m-Fluoro | 4.2 | 100 | 71 |
| o-Chloro | 3.3 | 100 | 24 |
| o-Bromo | 3.4 | 100 | 13 |
| o-Fluoro | 4.3 | 100 | 11 |
| p-Chloro | 5.1 | 80 | 83 |
| p-Bromo | 2.9 | 73 | 35 |
| p-Fluoro | 6.8 | 87 | 49 |
| 2,3-dichloro | 2.2 | 100 | 106 |
| 2,4-dichloro | 5.5 | 100 | >259 |
| 2,6-dichloro | 2.9 | 100 | 30 |
| 3,4-dichloro | 3.4 | 53 | 44 |
| 3,5-dichloro | 1.2 | 100 | 145 |
| m-Methyl | 7.3 | 100 | 55 |
| o-Methyl | 7.4 | 100 | 33 |
| p-Methyl | 7.4 | 60 | 102 |
| 2,6-dimethyl | 9.9 | 100 | 8 |

The compounds all exhibited muscle relaxant activity, indicated by extensor tonus block and body temperature fall. The activities of the compounds did not decrease over the period from ½ hour after administration to 2 hours after administration, indicating that the compounds were long-acting. It is preferred that the elevation of Metrazol threshold be not more than about 100%, more preferably not more than 50%, for use as a muscle relaxant. An increase in the Metrazol threshold of greater than 100% indicates that the compound has sedative-hypnotic properties.

Similar tests conducted with 1-(2,4-dichlorophenyl)-5-aminotetrazole at 100 mg./kg. indicated an activity at 6 hours of about 50% of the half-hour activity and continued activity at 24 hours, based on Metrazol threshold elevation.

A similar battery of tests were conducted with 1-benzyl-5-aminotetrazole and 1-phenethyl-5-aminotetrazole and provided the results shown in Table II-A.

TABLE II-A.—CENTRAL NERVOUS SYSTEM DEPRESSANT ACTIVITIES OF 1-(SUBSTITUTED)-5-AMINOTETRAZOLES

| | Body temp. fall, °F. | H.L. extensor tonus block, percent of animals | Metrazol threshold increase, percent |
|---|---|---|---|
| Substituent: | | | |
| Phenethyl | 8.3 | 40 | 108 |
| Benzyl | 7.6 | 100 | 7 |

In toxicity studies with 1-(2,4-dichlorophenyl)-5-aminotetrazole, administration at relatively high doses to rats for one month produced no toxic manifestations, and a low order of toxicity was found in standard toxicity studies on rabbits and dogs. Tests for determining the acute oral toxicity in mice resulted in 0/5 dead at 400 mg./kg., 0/10 dead at 800 mg./kg., and 4/10 dead at 1600 mg./kg. In tests for determining the acute oral toxicity in rats, the m-chlorophenyl and the 3,4-dichlorophenyl compounds administered at 800 mg./kg. resulted in 0/5 dead, and the m-bromophenyl, m-fluorophenyl, o-bromophenyl, p-bromophenyl, p-fluorophenyl, 2,3-dichlorophenyl, 2,6-dichlorophenyl, and 3,5-dichlorophenyl compounds resulted in 0/5 dead at 200 mg./kg. The results demonstrated relatively low toxicity for the 1-halophenyl-5-aminotetrazoles.

EXAMPLE 6

1-(2,4-dichlorophenyl)-5-aminotetrazole was tested clinically in out-patient treatment of rheumatoid arthritis. The compound was administered orally in tablets each containing 200 mg. of the compound, in compositions I and J set forth in Example 3, above. The tablets were taken four times daily in equal amounts.

Analyses performed on the patients included serum glucose oxidase transaminase (SGOT), serum glutamic pyruvate transaminase (SGPT), complete blood count (CBC), blood urea (BUN), and urine.

The patients were classified according to the standards promulgated by the American Rheumatoid Association, and the response was measured by joint score. Joint score is obtained by evaluating ten joints for heat, swelling, tenderness, and pain, representing a total of forty separate evaluations. Each evaluation is scored 0, ½, 1, 2, 3, or 4, from no joint involvement to maximum involvement. The joints evaluated are (1) the proximal interphalangeal; (2) the metacarpophalangeal; (3) and (4) the wrists; (5) and (6) the elbows; (7) and (8) the knees; and (9) and (10) the ankles.

Of fourteen patients treated, nine showed marked improvement, one showed mild improvement, one could not be assessed, and three did not respond to the treatment. The case histories of the patients who showed marked improvement are as follows:

Case history No. 1

M. F. was a 50 year old diabetic female in her menopause with rheumatoid arthritis, Class I, Grade II. Treatment with 800 mg. per day of the tetrazole compound commenced on April 24.

When next seen on May 1, she reported subjective improvement and showed a mild lessening in objective joint score. At this time the dose was increased to 1600 mg./day. She returned on May 15, and it was noted that she had only taken 600 mg./day because of the misunderstanding through language difficulty and had noted indifferent subjective relief. Drug was continued at the dose of 1600 mg./day. When next seen on May 22, she had no subjective complaints, and her joint score appeared to be moderately improved. At that time the drug was increased to 3200 mg./day.

When next seen on May 29, the patient stated that she sometimes felt very good and sometimes had pain all over. At this time her joint score was 4. Therapy was continued at 3200 mg./day. When next seen on June 5, her joint score was 3½, and she stated she had very little pain. On June 19, she had very little pain. Her joint score was 3. Two weeks later the patient stated that she felt fine, and her joint score at this time was 1.

On July 10, the patient had complained of numbness of her hands at night but she was in her menopause and was also diabetic. At that time her joint score was 1. Drug therapy was continued at 3200 mg. per day. When next seen on July 24, her joint score was 2 and she complained of pain in her right arm. When next seen on July 31, the patient's joint score was ½. She had little pain. 3200 mg./day of the drug were continued. When next seen on August 21, the patient had remained away from the clinic for 2 weeks because of severe toothache and had been off the drug for about 2 weeks with increasing pain and swelling in her right hand. At this time her joint score was 6 and the drug was reinstituted at 3200 mg./day.

When next seen on August 28, she had some pain in her shoulder and neck. Joint score was 1½ and at this time her SGOT had risen to 125 units, and although her other tests remained normal, the drug was discontinued for 1 week as a precautionary measure. On September 5, the SGOT value was 71 and the SGPT value was 42. In August and September, the SGOT and SGPT assays in the laboratory were found to be unreliable because of technical problems. On September 18, when her SGOT and SGPT values were found to be normal by improved assay methods, the drug was resumed at 1600 mg. per day. On September 25, her joint score had dropped to 1. She still had considerable pain in her neck and head.

On October 2, the joint score was 2½ and pain reported by the patient was less. All laboratory tests were in the normal range. At this time, the drug was increased to 2400 mg. per day. She did not return until October 30, because of family trouble, at which time she had been out of medicine for 2 weeks. Laboratory tests were all normal, and her joint score at this time was 2. It was interesting that she had no increase in joint pain in spite of being off drug for 2 weeks. Therapy was resumed at 2400 mg. of the drug per day.

When next seen on November 6, the patient was totally free of pain and her joint score was 0.2400 mg. of the drug daily was continued. When next see on November 13, she had had no pain and her joint score was still 0. On November 20, the patient felt well, joint score was 0, and the drug dosage was reduced to 1600 mg. per day. In spite of follow-up letters, this patient failed to return to the arthritis clinic from that time on. Aside from the alteration of SGOT and the reasons for it described previously, no other significant changes in laboratory profile occurred.

The clinical response to the tetrazole compound thus was excellent.

Case history No. 2

M. D. was a 60-year-old white female who had definite rheumatoid arthritis of a little over 2 years duration when first treated. On April 24, treatment with 800 mg. per day of the tetrazole compound commenced concurrently with termination of her previous steroid treatment. At this time pain was considerable and the joint score was 7.

On May 1, the patient reported that she had increased pain although her joint score was still 7. At this time, the dosage was increased to 2400 mg./day. On May 8, the patient still felt pain but at this time her joint score was 4½. On May 15, the patient stated that she had relief of soreness. At this time her joint score was 1. The drug was continued at 2400 mg./day. On May 22, the patient had had an upper respiratory infection with an increase of pain, which is as expected. At this time her joint score was 5. Dosage was increased to 3200 mg. per day. When next seen on May 29, she had very little pain and much less stiffness. At this time her joint score was 1½. The drug was continued at 3200 mg. per day.

When next seen on June 5, the patient reported that during the previous week she had developed nausea and diarrhea and had been seen by a private physician who decided she had a virus condition and administered unknown antibiotics in capsules which were black and yellow. Two days after she finished her antibiotics she developed maculopapular skin rash and discontinued her arthritic medicine. Two days later her rash had cleared, and she had no further joint pain. This time her joint score was 0.5. It was later found that the antibiotic she had been taking was Mysteclin-F.

When next seen on June 12, the patient had no rash and had resumed medication for one day without recurrence. During the interval she had had no return of pain. Drug treatment was resumed at 3200 mg. daily. After three days of this the patient developed rash and headache and discontinued her drug, whereupon the rash cleared up. This appeared to be a clear cut instance of drug rash. Without medication from June 19, the patient failed to develop any pain or objective evidence of joint activity until about September 5, of the same year.

The tetrazole compound thus was found to be highly effective.

Case history No. 3

M. K. was a 48 year old white female with rheumatoid arthritis of two years duration complicated by advanced diabetes, peptic ulcer, and diabetic retinopathy. She was almost totally disabled and could not comb her hair or feed herself. Previous treatment included glucocorticoids which were discontinued when she developed a duodenal ulcer.

Treatment with 1600 mg. per day of the tetrazole compound commerced on April 18. During the first two weeks of drug therapy, the patient required both sedatives and salicylates to control pain. Beginning with the third week, she obtained very marked relief of pain and stiffness and recovered motion. According to her own estimate she had about 95% relief of pain. It is to be stressed that no adverse effect on either her diabetes or her peptic ulcer developed as a result of drug therapy. All her laboratory findings remained within normal limits. She returned to the clinic on May 13, at which time she had discontinued the medicine because of vomiting. Both she and her mother, who was not taking medicine, had had vomiting for the previous three days. This patient was very much depressed because of the increasing loss of vision due to her retinotrophy. At this time there was no objective evidence of joint involvement and her joint score was 0.

When next seen on May 20, she had minimal pain in her hands and shoulder, and there was no objective evidence of joint involvement. Her joint score was 0. When next seen on May 27, her joint score was .05. The patient continued to be very depressed by her loss of vision. Drug was increased to 2400 mg. per day. On June 3, the patient had minimal pain but was continuing to vomit small amounts of food without any ulcer pain symptoms, exactly the same as she did prior to receiving the drug. Objecting joint score was 0. At this time the drug was discontinued for one week to convince this patient that there might be no association between drug and vomiting. When next seen on June 10, the patient stated nausea had stopped as soon as she stopped the drug. She had noted an increase in pain. She did not wish to resume the drug. When next seen on September 9, the patient had been off medication for 3 months with increasing pain and with recurring bouts of gastric pain, nausea and vomiting.

This patient had an excellent objective response to the drug. Since nausea and vomiting occurred when she was not taking drug, it was very difficult to attribute this complication to drug therapy. Her laboratory findings remained within normal limits throughout.

The objective response to the tetrazole compound thus was excellent.

Case history No. 4

L. R. was a 59 year old Puerto Rican female who had been treated with an average of 15 mg. per day of Prednisone with no relief. Treatment with 1600 mg. per day of the tetrazole compound was commenced on January 22. At this time, the joint score was 9.5 and there was marked pain.

On January 29, she had noted a decrease in pain, and her joint score was 2. Drug treatment was continued. February 5, the patient had no pain, and the joint score was 1. Drug therapy at 1600 mg. per day was continued. On February 12, she had no pain, and the joint score was 1. Drug treatment was continued at 1600 mg. per day until February 26, at which time she had felt well and had a joint score of 0. On March 4, the patient had no pain and her joint score was 0. Dosage of the drug was reduced to 800 mg. per day. On March 11, she felt well, but her joint score was 0.5.

When next seen on April 1, she had been without medication because she had had a severe upper respiratory infection. She had no joint pain, and her joint score was ½. At this time, the drug was discontinued for control. On October 15, she had neither joint pain nor objective evidence of joint involvement. When last seen for followup on December 30, this patient continued to remain free of pain and had no objective evidence of involvement. No significant abnormalities of any kind were noted in the laboratory findings.

Case history No. 5

F. H. was a female who had rheumatoid arthritis, Grade III, Class I, with a 10 month history of joint pain, swelling and tenderness. Treatment with 1600 mg. per day of the tetrazole compound commenced on October 16, at which time the joint score was 11.

When next seen on October 23, she had less pain but still was not comfortable. Her joint score at this time was 5½. 1600 mg. of the drug daily were continued. On October 30, her joint score had dropped to 1.5. She still had some discomfort. This time she noted a faint macular rash, and the drug was discontinued for 1 week. When next seen on November 6, she had very little pain and her joint score was 1. This patient was then switched to another type of drug therapy. This patient exhibited eosinophilia at the time of her skin rash.

There was thus a good response to the tetrazole compound. Treatment was terminated because of drug rash.

Case history No. 6

J. J. was a 54 year old negro male who had joint swelling and pains for about 6 years with poor response to glucocorticoids at a level of 15 mg. of prednisone per day. He also had marked evidence of hypercorticoidism. Treatment with 1600 mg. per day of the tetrazole compound and 15 mg. per day of prednisone was commenced on February 12 at which time the joint score was 12.5.

On February 19, he had noted little less stiffness. This time his joint score was 7, and treatment was continued. On February 26, the joint score was 4½ and the same dosage of the drug was continued. On March 4, the joint score was 5, and drug treatment was continued at the same dosage level. On March 11, the patient had less stiffness. It is to be noted that this patient is hyposensitive to pain, and no subjective assessment of pain is possible. At this time, his joint score was 2½.

On March 18, he reported increase in stiffness of joints, and the joint score was 4. Drug treatment was continued unchanged. Drug was continued at the same dose except on March 25, prednisone was reduced to 5 mg. per day, and on April 22, prednisone was discontinued while 1600 mg. per day of the tetrazole compound was maintained. On April 29, the patient had noticed itching rash between his fingers and soreness of the involved skin. At this time the drug was discontinued. Joint score then was 5. This patient developed an eosinophilia of approximately 4% at the time of his drug rash. It is interesting that he has had elevations of SGOT transaminase at times when he was on drug and when he was not receiving any drug. Whenever he had marked muscular pain involvement, SGOT transaminase would rise while the SGPT would remain within normal limits.

This patient thus had good response to tetrazole compound treatment.

Case history No. 7

M. B. was a 53 year old white female who had developed rheumatoid arthritis 27 years previously and had been treated since then with steroids, gold, and salicylates. When first seen on March 4, she was severely disabled in spite of 15 mg. of prednisone per day orally and intraarticular administration of glucocorticoids in both knees. Prednisone was continued at 5 mg. three times daily, and the tetrazole compound was instituted at a dose of 1600 mg. per day.

When next seen on March 11, there had been significant relief of pain. Drug therapy was continued unchanged. When next seen on March 18, she reported that 4 days previously she developed redness and burning of the face, back, neck and both legs, and discontinued taking the drug. The redness cleared in 24 hours. At this time the joint score had dropped very markedly, and the tetrazole compound was discontinued because of apparent drug reaction. No changes in her laboratory profile were noted during this time.

Thus, there was a good response to the tetrazole compound, complicated by drug rash.

Case history No. 8

E. L. was a 59 year old white female with rheumatoid arthritis of 9 years duration, Grade III, Class III. She previously failed to respond to gold, glucocorticoids and Indomethacin. On admission May 31, her joint score was 43.5.

Tetrazole compound therapy began at 1600 mg. per day on June 1. It was increased to 2400 mg. daily on June 2, and to 3200 mg. per day on June 5. On June 9, drug therapy was discontinued because of the appearance of a morbilliform skin rash. On June 6, her joint score had dropped to 17. In spite of skin rash, this patient did not exhibit any significant changes in eosinophil level or any other abnormality in the laboratory findings. She has subsequently been treated successfully with another drug.

Thus, there was a good response to the tetrazole compound complicated by skin rash.

Case history No. 9

C. V. a 32 year old white female, had rheumatoid arthritis of one year's duration, Grade II, Class I. She had been receiving 6 mg. per day of Triacinolone, which was continued. Additionally, 1600 mg. per day of the tetrazole compound was administered, commencing September 2.

On September 23, there was lessening of pain and marked lessening of objective joint score. On October 7, Triamcinolone was reduced to 4 milligrams and the joint score was 0. The patient then was transferred to another drug. No abnormalities in her laboratory profile were present.

The clinical results upon treatment with the tetrazole compound thus was good.

It will be noted from the foregoing case histories that marked improvements were obtained in patients suffering from rheumatoid arthritis, in particular, where prior glucocorticoid and other treatments had been unsuccessful, and in the presence of other maladies.

From the foregoing it becomes apparent that the invention herein described and illustrated fulfills all of our objectives, expressed and implied, in a remarkably unexpected fashion and that we have developed new and useful compounds, pharmaceutical compositions and therapeutic methods for providing muscle relaxation and alleviating inflammatory conditions.

While certain preferred embodiments of the invention have been described, it will be apparent to those skilled in the art that various changes and modifications may be made within the spirit and scope of the invention. It is intended that such changes and modifications be included within the scope of the appended claims.

We claim:

1. A pharmaceutical composition useful for anti-inflammatory therapy and in the form of a tablet, capsule, pacekt, lozenge, solution, suspension, ointment, emulsion or suppository comprising as its active ingredient an effective amount of a compound selected from the group consisting of 1-(substituted)-5-aminotetrazoles and pharmaceutically acceptable salts thereof, and a pharmaceutical carrier, said (substituted) moiety being selected from the group consisting of substituted phenyl, benzyl, substituted benzyl and phenethyl, said substituted phenyl being di-halophenyl, di-hydroxyphenyl, di-alkylphenyl or di-alkoxyphenyl and said substituted benzyl being halobenzyl or alkyl benzyl.

2. A composition as defined in claim 1 wherein said dihalophenyl is dichlorophenyl.

3. A composition as defined in claim 2 wherein said halophenyl is 2,4-dichlorophenyl.

4. A composition according to claim 1 wherein said substituted benzyl is monochlorobenzyl, dichlorobenzyl or methylbenzyl.

5. A composition according to claim 1 wherein said dialkylphenyl is 2,6-dimethylphenyl.

6. A method of treating an animal suffering from an inflammatory condition comprising administering to said animal suffering from said condition the active ingredient according to claim 1 in an amount sufficient to alleviate the symptoms of the condition.

7. A method as defined in claim 6 wherein said halophenyl is dichlorophenyl.

8. A method as defined in claim 7 wherein said dichlorophenyl is 2,3-dichlorophenyl, 2,4-dichlorophenyl, 2-5-dichlorophenyl, 2-6-dichlorophenyl or 3-4-dichlorophenyl.

9. A method according to claim 6 in which said inflammatory condition is a rheumatoid disease.

10. A method according to claim 9 in which said disease is rheumatoid arthritis.

11. A method according to claim 10 in which said 1-substituted phenyl-5-aminotetrazole is 1-dichloro-phenyl-5-aminotetrazole.

12. A method as defined in claim 11 wherein said dichlorophenyl is 2,4-dichlorophenyl.

References Cited

UNITED STATES PATENTS 3,278,381  10/1966  Bossinger et al. __ 167—65MUS

OTHER REFERENCES

J.A.C.S. Henry, 77, pp. 2264–2270 (1955).
Chem. Abst., 48, pp. 12092i–12093 (1954).

STANLEY J. FRIEDMAN, Primary Examiner

U.S. Cl. X.R.

260—308.4